United States Patent
Berg et al.

(10) Patent No.: US 8,423,311 B2
(45) Date of Patent: Apr. 16, 2013

(54) METHOD FOR CALIBRATING AND OPERATING A MEASURING CELL ARRANGEMENT

(75) Inventors: Christian Berg, Uerikon (CH); Carsten Strietzel, Feldkirch (AT)

(73) Assignee: Inficon GmbH, Bad Ragaz (CH)

( * ) Notice: Subject to any disclaimer, the term of this patent is extended or adjusted under 35 U.S.C. 154(b) by 194 days.

(21) Appl. No.: 12/669,740

(22) PCT Filed: Jun. 9, 2008

(86) PCT No.: PCT/CH2008/000256
§ 371 (c)(1),
(2), (4) Date: Jan. 19, 2010

(87) PCT Pub. No.: WO2009/012605
PCT Pub. Date: Jan. 29, 2009

(65) Prior Publication Data
US 2010/0198545 A1 Aug. 5, 2010

(30) Foreign Application Priority Data

Jul. 23, 2007 (CH) ........................................ 1173/07

(51) Int. Cl.
*G01L 27/00* (2006.01)
*G01L 19/04* (2006.01)
(52) U.S. Cl.
USPC .............................................. 702/98; 73/708
(58) Field of Classification Search .................... 702/98; 73/708
See application file for complete search history.

(56) References Cited

U.S. PATENT DOCUMENTS

| | | | | |
|---|---|---|---|---|
| 4,866,640 A | * | 9/1989 | Morrison, Jr. ................... | 702/98 |
| 5,307,683 A | * | 5/1994 | Phelps et al. ..................... | 73/708 |
| 6,035,721 A | * | 3/2000 | Krisch ............................. | 73/708 |
| 2006/0288758 A1 | * | 12/2006 | Woo et al. ....................... | 73/1.58 |
| 2007/0089524 A1 | * | 4/2007 | Walchli et al. .................. | 73/718 |
| 2007/0108671 A1 | * | 5/2007 | Hong et al. ...................... | 266/78 |
| 2007/0185673 A1 | * | 8/2007 | Hubanks et al. ................ | 702/85 |

* cited by examiner

*Primary Examiner* — Jonathan C Teixeira Moffat
*Assistant Examiner* — Regis Betsch
(74) *Attorney, Agent, or Firm* — Notaro, Michalos & Zaccaria P.C.

(57) ABSTRACT

Calibrating a measuring cell arrangement having a diaphragm vacuum measuring cell having a programmable heater for heating the diaphragm vacuum measuring cell to a constant presettable temperature. The heater encompasses the measuring cells and is encompassed by an insulation jacket. The method includes setting a first heating temperature on the measuring cell to a constant preset value, performing a first calibration step by generating at least one preset pressure in a vacuum volume and obtaining vacuum measuring signals of the measuring cell and at least one reference measuring cell, storing pressure values in the memory, determining compensation values from the difference values of the measuring cell and the reference measuring cell, intermediately storing these difference values in a calibration data memory and gauging the measuring cell by transmitting the determined compensation values to the measuring cell data memory.

18 Claims, 4 Drawing Sheets

METHOD FOR CALIBRATING AND OPERATING A MEASURING CELL ARRANGEMENT

FIELD AND BACKGROUND OF THE INVENTION

The invention relates to a method for calibrating and operating a vacuum measuring cell arrangement, as well as to a method for operating a calibrated measuring cell arrangement.

At least three methods are known and feasible for the calibration of measuring cells. While within the metrology of a national standards institute, as for example the Physical-Technical Federal Institute (PTB, Germany), the methods with static and dynamic expansion are conventional, in the industrial manufacturing of measuring cells the approach of comparison with a transfer standard is preferably applied. The reasons are primarily the complexity of construction systems for the expansion methods, and particularly the time necessary to carry out a calibration using these methods. However the calibration method of the comparison with a transfer standard also requires taking into consideration some ancillary conditions, such as are stipulated in the standards DIN 28418 and DKD-R 6-2 or ISO/TS 3567:2005. The calibration of vacuum measuring cells is described for example in the literature citation Wutz-Adam-Walcher (Verlag Vieweg, ISBN 3-528-04884-0) in Chapter 11.8 Calibration of Vacuum Gauges.

It is known to measure pressures or pressure differences by pressurizing a thin diaphragm and measuring its deflection. A known and suitable method for measuring the deflection of such diaphragms comprises implementing the diaphragm arrangement as a variable electric capacitor, wherein, via an electronic measuring circuitry, the capacitance change is analyzed in known manner, which change correlates with the pressure change. The capacitor is formed by disposing the thin flexible diaphragm surface at a minimal spacing opposite a further surface and coating both opposing surfaces with an electrically conducting coating or developing them of an electrically conductive material. Upon pressure being applied to the diaphragm, the spacing between the two electrodes changes through the deflection leading to an analyzable capacitance change of the arrangement. Sensors of this type are produced of silicon in large piece numbers. The areal base body as well as also the diaphragm are herein often entirely comprised of silicon material. There are also designs with combined material composition, for example silicon with a glass substrate. The sensors can thereby be produced cost-effectively. As a rule, pressure sensors of this type are only applicable for higher pressure ranges in the range of approximately $10^{-1}$ mbar to a few bar. High resolution at lower pressures starting at approximately $10^{-1}$ mbar are no longer realizable utilizing silicon as the material. Sensors of this type are only conditionally suitable for typical vacuum applications. One of the reasons is that silicon reacts on its surface with the environment and in this way the sensitive sensor characteristic is disturbed. Water vapor contained in normal atmospheric air already leads to corresponding reactions on the surfaces. The problem is additionally exacerbated if the sensor is employed in chemically aggressive atmospheres, which is increasingly common in current reactive vacuum plasma processes.

One important application field in general are processes in the semiconductor industry. Here, semiconductors are produced utilizing, for example, the following techniques: chemical vapor deposition (CVD), physical vapor deposition (PVD), implanting and (dry) etching processes. Typical pressure ranges for processes in the semiconductor industry and pressure ranges of vacuum measuring cells typically operate in the range of $10^{-4}$ to 10 mbar. Typical process measuring cells for the applications are capacitive diaphragm measuring cells. In such processes, such as for example in vacuum etching methods, in particular especially aggressive media, such as fluorine, bromic acid and their compounds are employed. Due to such corrosion and resistance problems, the known silicon pressure sensors and diaphragm measuring cells with metallic diaphragms can only be employed to a limited extent.

For such applications there is increasing demand for being able to operate the diaphragm measuring cell at increased temperatures in order to be able to operate the measuring cell, for one, in a hot process environment and/or to avoid as much as feasible condensates in the measuring cell and to do this at high corrosion resistance.

There is expectation that the market demand for high-temperature diaphragm measuring cells will increase over the next years, for example due to the introduction of atomic layer deposition (ALD) in semiconductor production processes, which require pressure measurements at temperatures up to 300° C. or higher in certain applications. The apparatus structure for ALD processes is very similar to that of low pressure CVD (LPCVD) or CVD apparatus, which today are the most significant purchasers of measuring cells operated at increased temperatures.

A diaphragm measuring cell preferred for these applications is the capacitive diaphragm measuring cell (CDG). A capacitive diaphragm measuring cell, also referred to as capacitance diaphragm gauge (CDG), is based on the elastic deformation of a thin diaphragm, which is suspended over a solid, areal body and thus separates two volumes from one another. A pressure change in these volumes induces the diaphragm to move. The distance between the housing and the diaphragm changes. At high pressures the diaphragm is deflected more strongly than at low pressures. Metallic electrodes are disposed in the gap region on the diaphragm and on the base body which is located opposite the diaphragm. These two metal electrodes form a condenser capacitance. The capacitance change is consequently a measure of the pressure change. This measuring principle is independent of the type of gas.

It has therefore been proposed to produce measuring cells for vacuum pressure measurements of corrosion-resistant materials such as $Al_2O_3$. U.S. Pat. No. 6,591,687 B1 describes a capacitive vacuum measuring cell (CDG) which is substantially structured entirely of ceramic and thus is highly corrosion resistant. The content of this patent is herewith declared to be an integrated component of the present invention description. In order to measure, for example, very low pressures to $10^{-6}$ mbar with high accuracy, a very thin ceramic diaphragm of 25 μm to 100 μm thickness is preferably utilized, which is disposed substantially symmetrically in a ceramic housing. For the application at higher vacuum pressures up into the range of several 100 mbar, diaphragm thicknesses up to 950 μm are, for example, preferred. This diaphragm-based vacuum measuring cell is commercially highly successful and indicates a significant advance with respect to corrosion resistance.

A further preferred diaphragm measuring cell arrangement is based on the above described measuring cell of $Al_2O_3$ and utilizes a similar structure, wherein the degree of deflection of the diaphragm in this case takes place with the aid of optical means. In an optical diaphragm measuring cell, also referred to as optical diaphragm gauge (ODG), the pressure-dependent deflection of the diaphragm is measured in the sensor with the aid of an optical system, wherein the measured signal is conducted using fiber optics to the optical signal processing unit, which subsequently converts the optical signal into an electrical signal. The coupling-in of the light necessary for this purpose takes place directly onto the diaphragm via appropriately light-permeable regions on the housing of the sensor. From here the light is reflected back. The arrangement forms part of an interferometric Fabry-Perot system. In the associated interferometer through the signal analysis the degree of diaphragm deflection is measured, which is the measure of the obtaining vacuum pressure to be measured. The optical windows are advantageously produced of sapphire such that at least portions of the housing of the diaphragm vacuum measuring cell comprise sapphire. It is also advantageous if the diaphragm itself is comprised of sapphire. The optical signal can be conducted, for example, over large distances (even kilometers), with very low attenuation and without falsification through ambient disturbances, such as primarily electromagnetic interferences, vibrations and changes of ambient temperatures. Such a measuring cell can also be operated especially well as a heated measuring cell. A preferred disposition of an optical vacuum measuring cell has been described in the US application 2007 0089524 A1. The content of this patent application is herewith declared to be an integrated component of the present invention description.

A further improvement of the service life of such diaphragm measuring cells comprises that the connection regions between diaphragm and housing, as well as of the connection region for the connection fitting, and optionally the connection fitting itself, even when employed in aggressive process environments containing, for example, acids, halogens such as chlorine and fluorine, are covered and protected additionally with a thin corrosion-resistant layer. The deposition of such a protective layer, preferably of a metal oxide, is advantageously carried out with the aid of an ALD method, as is proposed in the patent application CH 01817/06. The content of this patent application is herewith declared to be an integrated component of the present invention description.

As already stated, in processes with aggressive gases, under especially high requirements made of measuring accuracy and long-term stability, heated measuring cells are preferably employed. Condensate depositions, for example, can thereby be decreased or avoided in regions within the measuring cell exposed to the process environment. Through the precise stabilization of the measuring cell temperature, instabilities through temperature effects can also be compensated. For this purpose correspondingly high complexities and costs are expended. For example, heating jackets, such as foil heating elements or heating tapes, are placed about the measuring cell which, in turn, are insulated in complex manner. The requisite electronic measuring circuitry, in turn, must be protected against these temperatures, for example by disposition at a spacing and through additional cooling measures, such as using ventilators and cooling bodies. Often additional heating elements, such as heating tapes, are utilized for heating the tubular inlets to the measuring cell. The temperatures are set to fixedly graduated values, such as for example 45° C., 100° C., 160° C. and 200° C., depending on the employment range for the processes to be measured. An arrangement especially suitable for heated diaphragm vacuum measuring cells with a heating system is described in the Swiss application CH 00985/07 by the same applicant. Herein a diaphragm vacuum measuring cell is disposed within a thermal container, which forms a heating configuration and thereby heats the measuring cell to the desired temperature, wherein the measuring cell connection for the vacuum pressure measurement is carried through the thermal container and in this region the thermal container is implemented as a thermal body in which a heat source is disposed. The thermal container is encompassed by an insulation jacket in order to insulate the heated thermal body against the environment and thereby to ensure the lowest feasible temperature gradients in the thermal container at low heat losses. Hereby a homogeneous temperature distribution on the measuring cell is made feasible at compact construction. The content of this patent application is herewith declared to be an integrated component of the present invention description.

Diaphragm measuring cells of aforementioned type supply a very small electric output signal which, accordingly, must be processed carefully. These measuring cells are also very sensitive, in particular to temperature changes. In the production, deviations occur with each measuring cell and especially so during operation at different increased temperature values. The more precisely the pressure measurements must be carried out, the more weight they carry and must therefore be taken into consideration correspondingly.

The measuring cells are therefore calibrated during their production and specially each in the operating points for which specified working application the measuring cell is intended. Calibration denotes the measurement of a test sample against a measurement standard or against a reference. Herein only the state is detected; the test sample is not, however, set to a standard state.

This setting is carried out in a separate step and is referred to as gauging. This gauging process means setting the test sample to a standard state. This action should subsequently preferably be followed by a further calibration. It is consequently important to differentiate between the two processes 'calibration' and 'gauging'.

According to the above definition, the following steps are conventionally performed in a calibration means: measuring the test sample against a standard, storing the data, calculating the compensation values, gauging the test sample, calibrating the test sample with the simultaneous preparation of the calibration report.

Each measuring cell must in particular also be calibrated to the appropriate intended measuring cell temperature. The calibration process, as stated, comprises a comparison measurement of the measuring cell to be tested against a standard, thus against a reference measuring cell. Herein the state is detected and the deviations for the desired measuring range is recorded. The determined deviations can subsequently be utilized to correct or to gauge accordingly the measuring signals generated by the measuring cell.

Such measuring cells can thus always only be operated at this precisely defined temperature for which it has been gauged. For each value of a desired measuring cell temperature in each instance a measuring cell specifically calibrated to it must be employed by the operator at the vacuum process unit. Depending on the applied process and the requirements, if another working temperature of the measuring cell is required, another measuring cell must be employed in each case which has specifically been calibrated for this purpose. This increases the complexity considerably and the operating temperature of the measuring cell cannot be simply changed by the operator on site.

SUMMARY OF THE INVENTION

The present invention consequently addresses the problem of eliminating the disadvantages of prior art. The present invention addresses in particular the problem of realizing a method for operating and for calibrating a compact diaphragm measuring cell arrangement with an integrated heating means and electronic measuring circuitry, which can be stably operated over a wider temperature range and at various temperature values, wherein the same measuring cell can be employed by the operator for various selected temperature values.

The problem is resolved in the introduced methods according to the invention. The dependent patent claims relate to advantageous further method steps of the invention.

According to the invention a measuring cell arrangement with a heatable diaphragm vacuum measuring cell is calibrated after its production by being measured against a reference measuring cell at least at one, preferably at least at two, pressure point(s) and at least two temperature values of the working range, wherein from the detected deviations compensation values are determined, which are saved in a calibration data memory in the measuring cell arrangement and from here can be called up upon demand for the gauging of the diaphragm vacuum measuring cell for the desired working ranges.

The stored compensation values can be called up during measuring operation by the operator from the calibration data memory on the measuring cell arrangement according to the desired employment range in order to gauge the measuring cell arrangement on site to optimal values and to do so at various desired employment temperatures. With a single measuring cell arrangement, consequently, diverse applications at various desired employment temperatures can thus be covered. It is consequently no longer necessary to utilize for each selected working point or employment range a separate measuring cell arrangement set-up for it in the producer factory.

This makes feasible realizing not only high measuring precision at good reproducibility but also high flexibility and cost savings of the operator. This also makes feasible for the producer to cover additionally a wide application range using only a single measuring cell arrangement whereby the transaction of orders and the warehousing becomes significantly simplified. Potential delivery problems are thereby also significantly decreased.

For carrying out the method according to the invention a measuring cell arrangement is advantageously utilized in which a diaphragm vacuum measuring cell is disposed within a thermal container which forms a heating configuration. The measuring cell is thereby heated to the desired temperature, wherein the measuring cell connection for the vacuum pressure measurement is carried through the thermal container, and the thermal container is implemented in this region as a thermal body in which a heating source is located. The thermal container is encompassed by an insulation jacket in order to insulate the heated thermal body against the environment and to ensure thereby the lowest feasible temperature gradients in the thermal container at low heat loss. Hereby a homogeneous temperature distribution on the measuring cell is made feasible at compact construction.

The various features of novelty which characterize the invention are pointed out with particularity in the claims annexed to and forming a part of this disclosure and are entirely based on the Swiss priority application no. 1173/07 filed Jul. 23, 2007 and International Patent Application PCT/CH2008/000256 filed Jun. 9, 2008, which is incorporated here by reference.

BRIEF DESCRIPTION OF THE DRAWINGS

In the following the invention will be explained schematically and by example in conjunction with Figures.

In the drawing depict.

DESCRIPTION OF THE PREFERRED EMBODIMENTS

Figure 1:
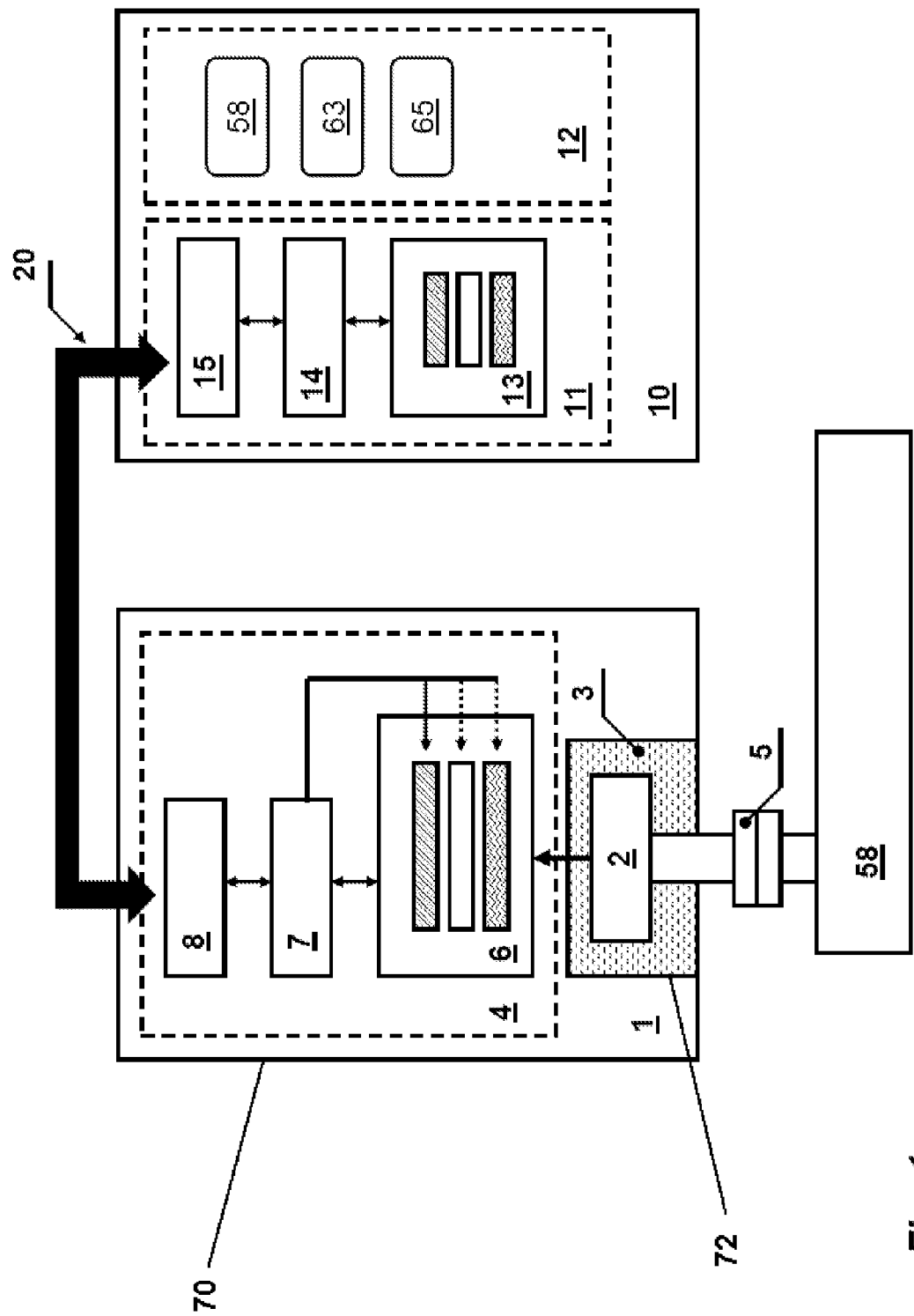
FIG. 1 schematically a measuring cell arrangement with a calibration means to demonstrate a calibration process at the factory, FIG. 2 schematically a measuring cell arrangement with a process control such as is employed for example at the operator site on a process unit, FIG. 3 schematically a measuring cell arrangement as a further example such as can be employed for example at the operator site by selecting and calling up certain compensation values for the gauging on the measuring cell itself, FIG. 4 schematically and in cross section a calibration means, such as can be employed for example with advantage at the factory.

For the method according to the present invention for the calibration of a measuring cell arrangement 1, a measuring cell arrangement 1 is especially suitable which includes as the pressure sensor a diaphragm vacuum measuring cell 2 of the type such as has been described previously. A configuration for calibrating such a measuring cell is shown schematically in FIG. 1. The diaphragm vacuum measuring cell 2 comprises an inlet with a measuring connector 5, which can be connected for example with a flange on a vacuum volume 58, 30. The vacuum volume 58, 30 can be a component of a calibrating means 10 and in measuring operation be a process-unit vacuum chamber 30. Via this measuring connector a connection is established between the diaphragm of the measuring cell and the vacuum volume at which the pressure is to be measured. The diaphragm vacuum measuring cell 2 is electrically connected, such as with electronic measuring cell circuitry 4, which comprises a measuring cell data memory 6, a measuring cell control 7 and a measuring cell interface 8 for the exchange of data with peripheral apparatus. The sensitive signal from the diaphragm vacuum measuring cell 2 is acquired and processed in this electronic measuring cell circuitry. The measuring cell arrangement 1 comprises, moreover, a programmable heating means 3 for heating the diaphragm vacuum measuring cell 2 to a presettable temperature, with a heating configuration 3 preferably encompassing the vacuum measuring cell 2 as completely as feasible and is encompassed by an insulation jacket 72 such as has already been described previously. All of these elements are with advantage disposed within a housing having an outer surface 70 such that the measuring cell arrangement 1 forms an independent apparatus component.

The measuring cell arrangement 1 is connected to the outside with a signal line 20 across the measuring cell interface 8. With this signal line 20, on the one hand, the measured pressure signal can be output and utilized and, on the other hand, data can also be read into the measuring cell arrangement 1 in order to control and/or program this arrangement with the aid of the electronic measuring cell circuitry 4 according to the desired requirements and, for example, to calibrate it. FIG. 1 depicts schematically a measuring cell arrangement 1 which is connected across the signal line 20 to a calibration means 10. This arrangement is utilized at the factory in order to calibrate a measuring cell arrangement 1.

The calibration means 10 comprises a calibration device 12 and an electronic calibration circuitry or procedure control 11. The calibration device includes a vacuum volume 58 to which the measuring cell arrangement 1 is connected across its measuring connector 5. The vacuum volume 58 is also connected to a reference measuring cell whose signals can be compared with those of the measuring cell arrangement 1 to be calibrated. With a heating configuration 63, preferably a heating chamber, the one or several measuring cell arrangement(s) 1 can be brought to a desired presettable constant temperature in order to generate defined conditions at various temperature working points. The calibration process proceeds within a presettable period of time 65. The calibration procedure control 11 includes a calibration data memory 13, a calibration control 14, which comprises, for example, a processor, and a calibration interface 15 to which the measuring cell arrangement 1 is connected with the signal line 20.

A preferred procedure for the calibration process comprises the following steps:
a) connecting the measuring cell arrangement 1 with a calibration means 10, preferably by placing it in a heating chamber 63, with connecting with the measuring connector 5 to a vacuum volume 58 and connecting the measuring cell interface 8 across a signal line 20 to a calibration procedure control 11, as well as switching on the measuring cell arrangement 1;
b) setting a first heating temperature on the measuring cell arrangement to a preset constant value;
(c) performing a first calibration step of the measuring cell arrangement 1 by generating at least one, preferably at least two different, preset pressure(s) in the vacuum volume 58 with the simultaneous acquisition of the vacuum measuring signals of the measuring cell arrangement 1 and at least one reference measuring cell 6, as well as storage of the acquired pressure values in a calibration data memory 13,
d) determining compensation values with a calibration processor 14 from the determined difference values of the measuring cell arrangement 1 and the reference measuring cell 6, as well as intermediate storage of these difference values in a calibration data memory 13 of the calibration procedure control 11,
e) gauging the measuring cell arrangement 1 by transmitting the determined compensation values to the measuring cell data memory 6 for the deviating values determined at the various preset working points for pressures and temperature in relation to the reference measuring cell 60.

The aforementioned implementation of a measuring cell arrangement 1 with its electronic measuring cell circuitry 4 and aforementioned structure with diaphragm measuring cell 2 and heating means 3 makes feasible, together with the method steps according to the invention, storing a set of compensation values which had been acquired during the calibration process, within the measuring cell arrangement 1 such that these, on demand for different desired applications with different working points, can be called up simply and thereby the measuring cell arrangement 1 is always set to optimal accuracy. The highly sensitive system of the diaphragm measuring cell technology can thereby be optimally utilized and at high economy very high, reproducible measuring accuracy over large working ranges can be attained. In addition, with the aid of the provided electronic measuring cell circuitry 4, interpolation methods can be employed between the acquired measuring points in order to increase further the accuracy and/or to expand the measuring range.

Figure 4:
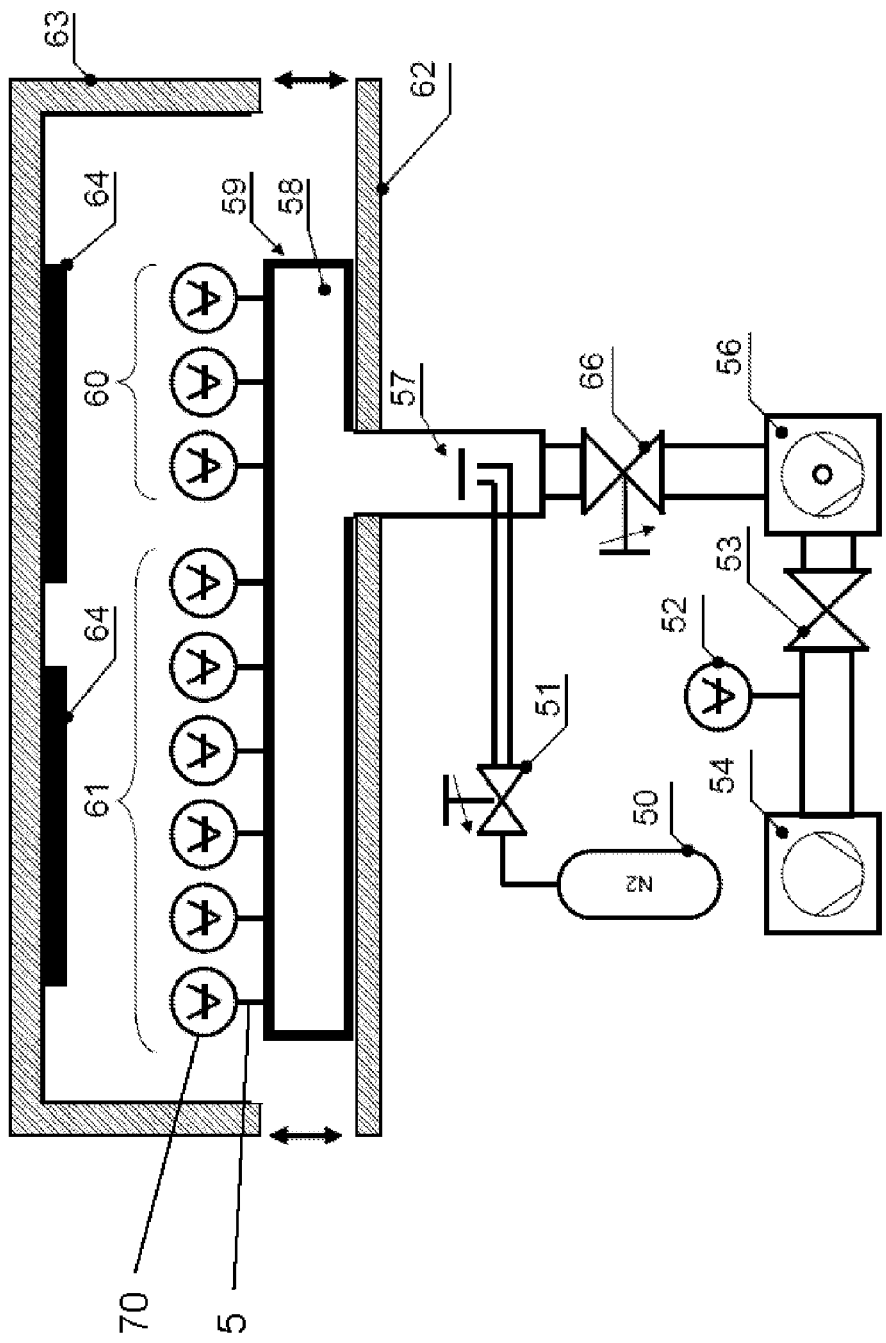

A calibration means 10 especially suitable for carrying out the method is schematically shown in FIG. 4. To a calibration vacuum chamber 59 with the vacuum volume 58 is connected one, preferably several, measuring cell arrangement(s) 1, 61 and preferably at least two reference measuring cells 60. To the same vacuum volume 58 is connected at least one reference measuring cell 60. All of the measuring cells are electrically connected to a calibration procedure control 11 for the specification of setting values and for acquiring and processing the measured values. A heating chamber 63 encompasses this calibration vacuum chamber 59 along with the measuring cells 60, 61 for the uniform heating of the arrangement to a preferably constant temperature value at which the calibration is to take place. The heating chamber 63 is advantageously heated with Peltier elements. The heating chamber can additionally be provided with an insulation 62 in order to attain the lowest feasible temperature losses and a uniform temperature distribution. The vacuum volume 58 is evacuated using a conventional pumping system comprising a forevacuum pump 54, a forevacuum valve 53, a forevacuum measuring cell 52 and a succeeding high-vacuum pump 56. After pumping down to a low pressure value, a calibration gas 50, for example nitrogen, is introduced into the vacuum volume 58 via a regulation valve 51 and the gas inlet 57 with screen-baffle, and the desired pressure is set at which a calibration step is to take place.

Before the calibration process, the vacuum volume 58 of the calibration means 10 should preferably be pumped down to a base pressure which is 5 orders of magnitude below the upper measuring range end of the measuring cell arrangement 1 to be calibrated. The measuring cell arrangement 1 should preferably cover a vacuum pressure measuring range of at least 2 to 4 orders of magnitude. It is advantageous if at least two different preset vacuum pressures of step c) are applied at the scale end value and at the scale beginning value of the measuring cell arrangement 1. Acquiring the measured values at more than two pressure points increases the accuracy of the measuring cell arrangement 1, 61 to be calibrated after the gauging step, wherein therewith the calibration complexity also becomes greater. Favorable conditions are attained if when performing step c) at least two to five, preferably five to ten, preset pressure values are acquired, and these are applied within the desired measuring range of the measuring cell arrangement 1 to be acquired.

It is often advantageous to carry out at least one further calibration step f) for at least one further pressure, analogously to the first step c), wherein this step serves as a control step and that potential determined value deviations between the values of the measuring cell arrangement 1 and the reference measuring cell 60 for the preceding measurement are retained in a memory for the further analysis.

The method makes feasible carrying out steps a) to e), preferably a) to f), for at least one further value of the heating temperature, preferably for three to six different heating temperature values. Hereby the same measuring cell arrangement 1 can be employed with high accuracy by the operator even at different measuring cell temperatures by simply calling up the stored calibration data sets with subsequent automatic gauging.

At the operator end the measuring cell arrangement 1 is utilized for vacuum pressure measurements in particular on process units for monitoring the vacuum at the corresponding vacuum chambers or vacuum generation systems. At a vacuum process unit often various process ranges must be monitored and several measuring cell arrangements 1 are often utilized.

Figure 2:
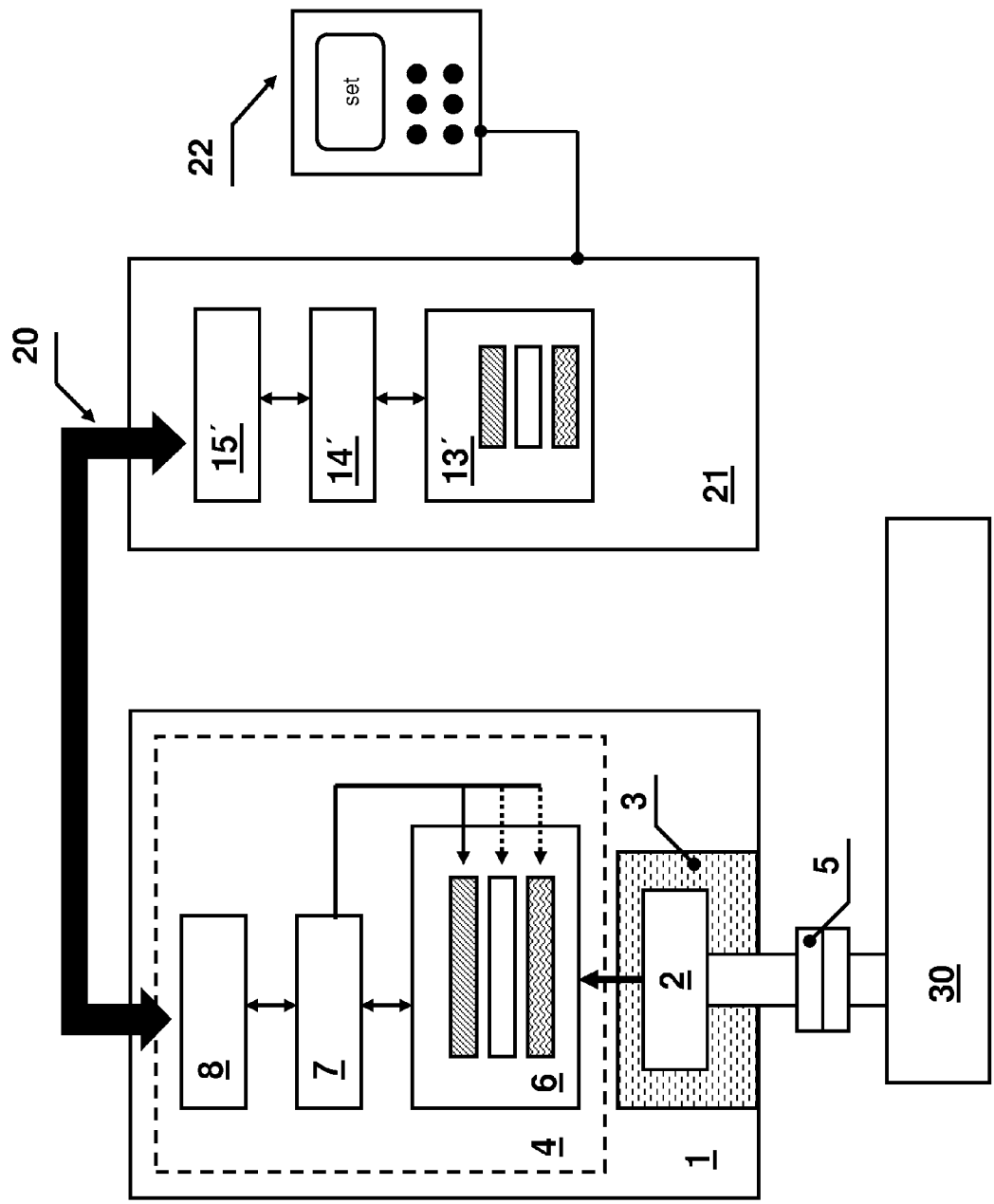

In such cases advantageously one vacuum control unit 21 is employed which is connected with one or several measuring cell arrangements 1 such that they communicate for the purpose of data exchange, as is shown schematically in FIG. 2. Such a vacuum control unit 21 includes again a data memory 13', a control processor 14' and an interface 15', which communicates across signal line 20 with the measuring cell interface 8. Such a vacuum control unit 21 can also be part of a process control of a vacuum process unit. However, an auxiliary control unit 22 or a process control can also be superordinately connected to the vacuum control unit 21. Depending on the required working points or ranges, these control units, in turn, permit calling up the desired data sets with the compensation values at the correct point in time at the measuring cell arrangement and to carry out the gaugings necessary for this purpose or also to load new data sets into the data memory 6 of the measuring cell arrangement 1.

Figure 3:
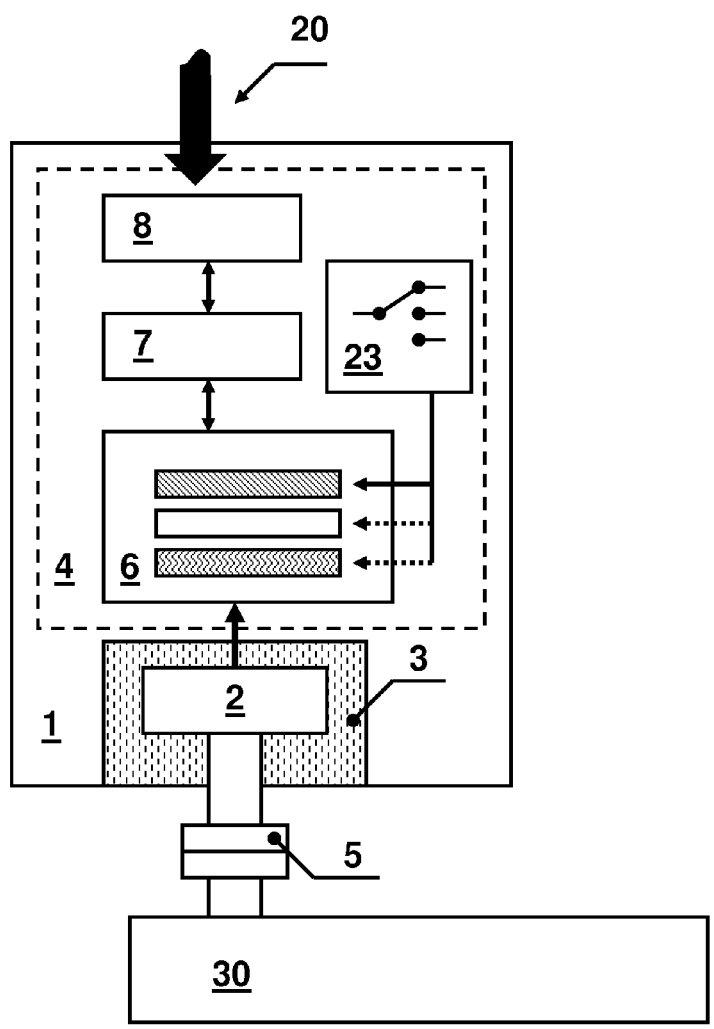

A further application case of a measuring cell arrangement 1 comprises utilizing this arrangement without external controls 21, 22 and calling up directly at the measuring cell arrangement 1 via a control switch 23 the desired compensation data for undertaking the gauging of the measuring cell as is demonstrated schematically in FIG. 3.

A preferred procedure for operating a measuring cell arrangement 1 for pressure measurements by the operator comprises the following steps:

the measuring cell arrangement is connected to a vacuum volume 30 of a vacuum process unit;

the temperature of the vacuum measuring cell 2 is set with the heating means 3 to a constant preset value;

the pressure signal output by the vacuum measuring cell 2 is processed in the electronic measuring cell circuitry 4 such that the compensation values saved in a measuring cell data memory 6 previously determined in a calibration process relative to a reference measuring cell 60 are utilized for the correction of the pressure signal with the aid of the measuring cell control 7;

the pressure signal thus corrected is transferred across the measuring cell interface 8 to peripheral devices 21, 22 for further utilization.

The invention claimed is:

1. Method for calibrating measuring cell arrangements, each of which forms an independent apparatus component, wherein each measuring cell arrangement comprises a diaphragm vacuum measuring cell having a measuring connector, the vacuum measuring cell being connected to electronic measuring cell circuitry, which circuitry comprises a measuring cell data memory, a measuring cell control and a measuring cell interface for the exchange of data with peripheral devices, a programmable first heating means encompassing the diaphragm vacuum measuring cell for heating the diaphragm vacuum measuring cell to a constant presettable temperature, the temperature being chosen depending on the process to be measured so as to inhibit condensate depositions within the measuring cell exposed to the process environment when the measuring cell is operated, wherein said first heating means is used additionally for calibrating the measuring cell arrangement, and an insulation jacket encompassing both the first heating means and the diaphragm vacuum measuring cell;

wherein the calibration process comprises the following steps:

a) connecting at least two of said measuring cell arrangements with a calibration means, with connecting the diaphragm vacuum measuring cell of each measuring cell arrangement measuring connector to a vacuum volume within the calibration means via a measuring connector which forms part of a sealed path between the diaphragm vacuum measuring cell and the vacuum volume, wherein the at least two measuring cell arrangements are each linked to the same vacuum volume, wherein each measuring cell has an outer surface which is not exposed to the vacuum volume, and connecting each the measuring cell interface to a calibration procedure control, wherein the at least two measuring cell arrangements are placed in a single heating chamber within the calibration means, the heating chamber including at least one heating chamber heating means;

b) switching on the measuring cell arrangements, and setting each measuring cell arrangement to a first heating temperature using the first heating means of each respective measuring cell arrangement, c) heating the heating chamber in the calibration means using a heating chamber second heating means, wherein the heating chamber heating means is part of the calibration means and is not part of a measuring cell arrangement, d) performing a first calibration step for the measuring cell arrangements by generating at least one preset pressure in the vacuum volume with the simultaneous acquisition of vacuum measuring signals from the measuring cell arrangements and also from at least one reference measuring cell, as well as storage of the vacuum measuring signals in a calibration data memory, e) determining compensation values with a calibration processor from determined differences between vacuum measuring signals of the measuring cell arrangements and of the reference measuring cell, f) gauging the measuring cell arrangements by transmitting the determined compensation values for temperature and pressure from the calibration means to the corresponding measuring cell data memories within the measuring cell arrangements, and g) repeating the steps a) to e) for calibrating the measuring cell arrangements using at least a second heating temperature on each of the measuring cell arrangements.

2. Method as claimed in claim 1, wherein the measuring cell arrangement covers a vacuum pressure measuring range of at least 2 to 4 orders of magnitude.

3. Method as claimed in claim 1, wherein step (d) is repeated using at least two different preset pressures in the vacuum volume, and wherein vacuum measuring signals taken at at least two different preset pressures are used to calculate the compensation values.

4. Method as claimed in claim 1, wherein at least one further calibration step f) is performed for at least one further pressure, analogously to step (d), wherein this step f) serves as a control step and wherein any determined value deviations between the values of the measuring cell arrangements and the reference measuring cell for the preceding measurement are retained in a memory for further analysis.

5. Method as claimed in claim 1, wherein in the calibration means the at least two measuring cell arrangements are simultaneously calibrated and that at least two reference measuring cells are utilized during calibration, the reference measuring cells and the measuring cell arrangements being different components.

6. A method for calibrating and operating a measuring cell arrangement, the method comprising:

(a) providing at least one measuring cell arrangement, the measuring cell arrangement comprising a diaphragm vacuum measuring cell, and also comprising a measuring connector leading to the vacuum measuring cell, the measuring cell arrangement further comprising electronic measuring cell circuitry connected to the vacuum measuring cell, the circuitry comprising a measuring cell data memory, a measuring cell control, and a measuring cell interface, the measuring cell arrangement further comprising a first heating means adjacent to the vacuum measuring cell for heating the vacuum measuring cell to constant presettable temperatures and also for holding the vacuum measuring cell at constant presettable temperatures, and the measuring cell arrangement further comprising an insulation jacket encompassing both the vacuum measuring cell and the first heating means, the insulation jacket being positioned between the first heating means and the measuring cell circuitry;

(b) providing a calibration means, the calibration means comprising a heating chamber which is within the calibration means, the calibration means containing at least one heating chamber heating element for selectively heating the heating chamber, wherein the heating chamber heating element is part of the calibration means and is not part of a measuring cell arrangement;

the calibration means further comprising a calibration vacuum chamber, the calibration vacuum chamber being for containing a vacuum volume, the calibration vacuum chamber occupying part of the heating chamber and also separating the vacuum volume from a portion of the heating chamber which is outside the calibration vacuum chamber, wherein the calibration vacuum chamber is in communication with a vacuum pump for selectively creating a vacuum, the calibration means further comprising calibration circuitry, the calibration circuitry comprising calibration data memory, and wherein the calibration means and all of its components are distinct and separable from the measuring cell arrangement and its components;

(c) providing at least one reference measuring cell inside the heating chamber of the calibration means, the reference measuring cell being in communication with the vacuum volume within the calibration vacuum chamber, the reference cell being adapted to take pressure readings of the vacuum volume, wherein the reference cell is a separate component from, and is not a part of, the measuring cell arrangement being calibrated;

(d) connecting at least one of said measuring cell arrangement to be calibrated to the calibration means, the measuring cell arrangement being placed within the heating chamber for calibration, with connecting the diaphragm vacuum measuring cell of the measuring cell arrangement to the vacuum volume via a measuring connector, the measuring connector defining at least part of an airtight pathway between the vacuum measuring cell and the vacuum volume, wherein the vacuum volume is sealed off from an area of the heating chamber which is outside of the calibration vacuum chamber, the area being sealed off from the vacuum volume including an outside surface of the measuring cell arrangement so that an outside portion of the measuring cell arrangement is not exposed to the vacuum volume, further with connecting the measuring cell arrangement to the calibration circuitry;

(e) heating the heating chamber in the calibration means using the heating chamber heating element, (f) heating the diaphragm vacuum measuring cell in the at least one measuring cell arrangement to a constant first heating temperature using the first heating means within the same measuring cell arrangement, wherein the first heating temperature of the diaphragm vacuum measuring cell is controlled separately from the temperature of the heating chamber;

(g) once the diaphragm vacuum measuring cell has been heated to the first heating temperature, performing a first calibration step for the at least one measuring cell arrangement, the first calibration step comprising:

generating at least one preset pressure in the vacuum volume, and concurrently acquiring vacuum measuring signals using the vacuum measuring cell of the at least one measuring cell arrangement, and also from the at least one reference measuring cell, wherein the vacuum measuring cell and the reference measuring cell both sample the same vacuum volume at substantially the same time, and storing the acquired vacuum measuring signals in the calibration circuitry, (h) repeating steps (e)-(g) at least a second time using a constant second heating temperature for the diaphragm vacuum measuring cell, said temperature being different from the first heating temperature;

(i) determining compensation values for the at least one measuring cell arrangement by using the calibration circuitry to compare differences between the stored vacuum measuring signals from the measuring cell arrangement and from at least one reference measuring cell, the comparison including comparing stored measuring signals having been taken by the measuring cell arrangement at at least two different temperatures, and storing the compensation values in the calibration circuitry;

(j) transmitting compensation values to the corresponding measuring cell arrangement, and saving the compensation values in the measuring cell data memory;

(k) removing the measuring cell arrangement from the calibration means after the compensation values have been saved in that measuring cell arrangement;

(l) using the measuring cell arrangement to accurately measure a vacuum, after the arrangement has been calibrated and removed from the calibration means, by a process comprising:

exposing the diaphragm vacuum measuring cell to a vacuum to be measured, taking a reading of the vacuum using the vacuum measuring cell, and transmitting the reading to the electronic measuring cell circuitry in the measuring cell arrangement, determining a reading temperature at which the reading was taken, and correcting the reading, using the compensation values previously stored in the measuring cell data memory, based on the reading temperature.

7. The method of claim 6 wherein the diaphragm vacuum measuring cell is a capacitive diaphragm measuring cell.

8. The method of claim 6 wherein the diaphragm vacuum measuring cell is an optically readable diaphragm measuring cell.

9. The method of claim 6, wherein for step (I) the first heating means of the measuring cell arrangement is set at a temperature not less than the temperature of the vacuum being measured so as to prevent condensation.

10. The method of claim 6, wherein steps (e)-(h) are repeated using at least two different preset pressures for the vacuum volume.

11. The method of claim 6, wherein steps (e)-(h) are repeated three to six times, each time using a different temperature for the same diaphragm vacuum measuring cell, the temperature being controlled including by the first heating means.

12. The method of claim 6, wherein the heating chamber heating means comprises a Peltier element.

13. The method of claim 6, wherein the heating chamber comprises insulation.

14. The method of claim 6, wherein more than one measuring cell arrangement is calibrated at the same time.

15. The method of claim 6, wherein more than one reference measuring cell is provided at step (c) and used in step (g).

16. The method of claim 14, wherein more than one reference measuring cell is provided at step (c) and used in step (g).

17. The method of claim 6, wherein the vacuum measuring cell and the first heating means collectively form a thermal body, wherein the insulation substantially surrounds the thermal body and is positioned between the thermal body and the measuring cell circuitry, and wherein the insulation reduces heat transfer out of the thermal body.

18. The method of claim 17, wherein the temperature of the thermal body of the measuring cell arrangement is independently controllable from the temperature of the heating chamber.

* * * * *